(12) United States Patent
Keely (10) Patent No.: US 7,671,845 B2
(45) Date of Patent: Mar. 2, 2010

(54) DIRECTIONAL INPUT DEVICE AND DISPLAY ORIENTATION CONTROL

(75) Inventor: Leroy B. Keely, Portola Valley, CA (US)

(73) Assignee: Microsoft Corporation, Redmond, WA (US)

( * ) Notice: Subject to any disclaimer, the term of this patent is extended or adjusted under 35 U.S.C. 154(b) by 1491 days.

(21) Appl. No.: 10/999,082

(22) Filed: Nov. 30, 2004

(65) Prior Publication Data

US 2006/0123362 A1 Jun. 8, 2006

(51) Int. Cl.
*G06F 3/02* (2006.01)
*G09G 5/08* (2006.01)

(52) U.S. Cl. .................................... 345/169
(58) Field of Classification Search .......... 345/156–184
See application file for complete search history.

(56) References Cited

U.S. PATENT DOCUMENTS

| | | | | |
|---|---|---|---|---|
| 5,661,632 A | * | 8/1997 | Register | 361/683 |
| 6,278,887 B1 | * | 8/2001 | Son et al. | 455/566 |
| 6,297,795 B1 | * | 10/2001 | Kato et al. | 345/684 |
| 6,374,089 B1 | * | 4/2002 | Till | 455/90.1 |
| 6,593,914 B1 | * | 7/2003 | Nuovo et al. | 345/169 |
| 2001/0007449 A1 | * | 7/2001 | Kobachi et al. | 345/156 |
| 2003/0044000 A1 | * | 3/2003 | Kfoury et al. | 379/433.04 |
| 2003/0107603 A1 | * | 6/2003 | Clapper | 345/784 |
| 2004/0046741 A1 | * | 3/2004 | Low et al. | 345/166 |
| 2004/0257341 A1 | * | 12/2004 | Bear et al. | 345/157 |
| 2005/0091431 A1 | * | 4/2005 | Olodort et al. | 710/72 |

* cited by examiner

*Primary Examiner*—Bipin Shalwala
*Assistant Examiner*—Steven E Holton
(74) *Attorney, Agent, or Firm*—Shook, Hardy & Bacon LLP (57) ABSTRACT

A computer system includes a processor creating a renderable image in a first orientation, a display showing the image in the first orientation, and a directional input device having an orientation indicator that is movable between a first position associated with the first image orientation and a second position associated with a second image orientation. The orientation indicator may provide a visual indication of the orientation of the image being shown on the display. The orientation indicator may be movable between a first position associated with the first image orientation and a second position associated with a second image orientation. The processor may create the renderable image in the second orientation and the display may show the image in the second orientation in response to the orientation indicator moving from the first position to the second position.

41 Claims, 10 Drawing Sheets

DIRECTIONAL INPUT DEVICE AND DISPLAY ORIENTATION CONTROL

BACKGROUND OF THE INVENTION

1. Field of the Invention

Aspects of the present invention relate to computer processing and information manipulation. More specifically, aspects of the present invention relate to a directional input device that is associated with orientation of a corresponding display, and to changing the image orientation of a display screen. The invention has application to computing devices having displays with a plurality of orientation modes and to a directional input device, such as a mouse wheel or a touch pad.

2. Description of Related Art

Typical computer systems, especially computer systems using graphical user interface (GUI) systems such as Microsoft WINDOWS, are optimized for accepting user input from one or more discrete input devices, such as a keyboard for entering text and a pointing device such as a mouse with one or more buttons for driving the user interface. The ubiquitous keyboard and mouse interface provides for fast creation and modification of documents, spreadsheets, database fields, drawings, photos and the like.

Some computer systems permit a user to write on a screen using, for example, a stylus. For instance, the Microsoft READER application permits one to add electronic ink to a document much the same way that a user would write with a standard pen and paper. Most hand-held computing devices, commonly known as Personal Digital Assistants (PDAs), also permit the user to write on the screen. Many of these computing devices are designed to support switching the electronic display between two orientation modes rotated ninety degrees from each other, such as a portrait mode and a landscape mode.

In addition to receiving inputs from the stylus, some of these stylus-entry systems are designed for use both with and without auxiliary input devices, such as a keyboard or a mouse. These auxiliary input devices may include directional input devices, such as a scroll wheel, which can be useful for scrolling a displayed image in linear direction. However, such a directional input device has limited ability to work in both display orientations. They are typically arranged for a default display orientation, such as the portrait mode, and do not work well in the alternate display mode.

The display orientation of these dual-mode display systems is switched via a soft key or via selection of an appropriate menu command. However, these known switch mechanisms are unduly complicated or do not provide the user with a quick and easy way to switch between the display orientations. Further, these systems lack indicators that readily identify the current orientation state of the display. Instead, they rely upon user recognition of the display image to determine its present orientation.

BRIEF SUMMARY

Aspects of the present invention address one or more of the issues mentioned above, thereby providing a better integration of directional input devices and display orientation control for a computer system having multiple display orientations. Various aspects of the invention may include a directional input device that automatically causes the display orientation to change based on a change in the orientation of the directional input device. Additional aspects of the invention may include movable directional input devices that indicate the orientation state of a display. Other aspects may include indicators, physical features and sensors that can provide related functionality.

Further aspects include methods for switching the orientation of an image on a display screen from a first orientation to a second orientation. In other aspects, computer-executable instructions for implementing the disclosed methods are stored on computer-readable media. These and other aspects are addressed in relation to the figures and related description.

DETAILED DESCRIPTION

Aspects of the present invention relate to switching display orientations and to directional input devices associated therewith.

This document is divided into sections to assist the reader. These sections include the following: Terms, General-purpose computing environment, Directional input device orientation and display orientation control, and Directional input devices.

Terms

Directional input device—An input device for receiving user input to modify a display in a substantially linear direction using a graphical user interface (GUI) system, such as Microsoft WINDOWS. The input device may receive user input to modify the display in a various linear directions. Modification of the display may include scanning displayed content shown on the display in a user-selected linear direction, such as by scrolling a document, moving a cursor on the display in the selected linear direction, and translating a selected item shown on the display in the selected linear direction. A directional input device may include a scroll wheel, a track ball, a sweep sensor and a touch pad.

Document—Any electronic file that has a viewable representation and content. A document may include a web page, a word processing document, a note page or pad, a spreadsheet, a visual presentation, a database record, image files, and combinations thereof.

Light-transmitting—Partially or completely transparent; Allowing light to pass through freely or diffusely.

Orientation indicator—A device for showing the display orientation condition of a computing apparatus.

Scan—Move through display content in order to show parts of the content that do not fit on the display.

Scroll—Scan through display content in a substantially linear direction.

System state—A temporary condition, attribute, configuration or information content of a computing device. A system state may include a sleep configuration, an error condition, a low power condition, a display orientation condition, or human contact with a human-contact surface or a proximity sensor.

General-Purpose Computing Environment

Figure 1:
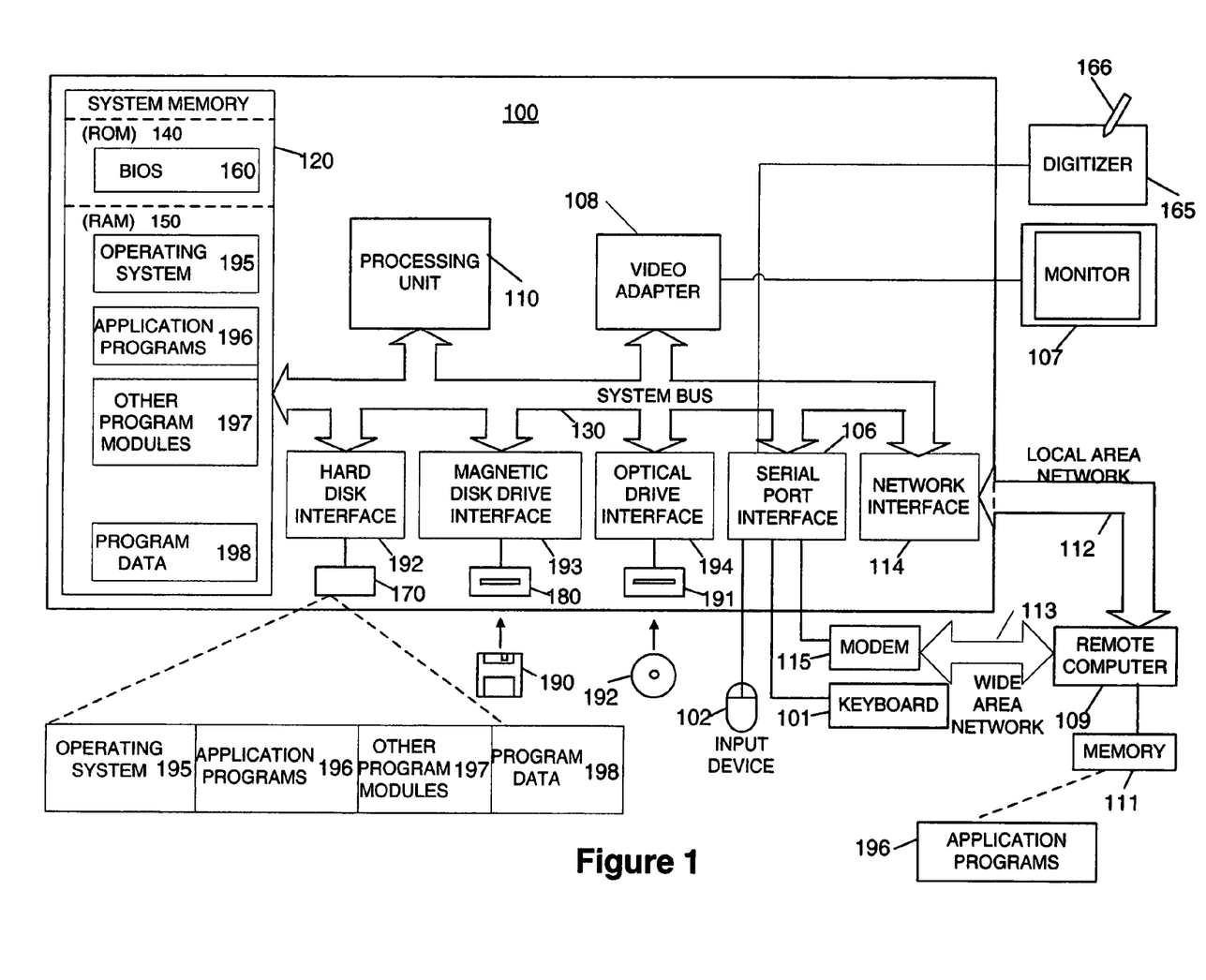
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device or other input device 102. Other input devices (not shown) may include a directional input device, a microphone, a joystick, a game pad, a satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2A:
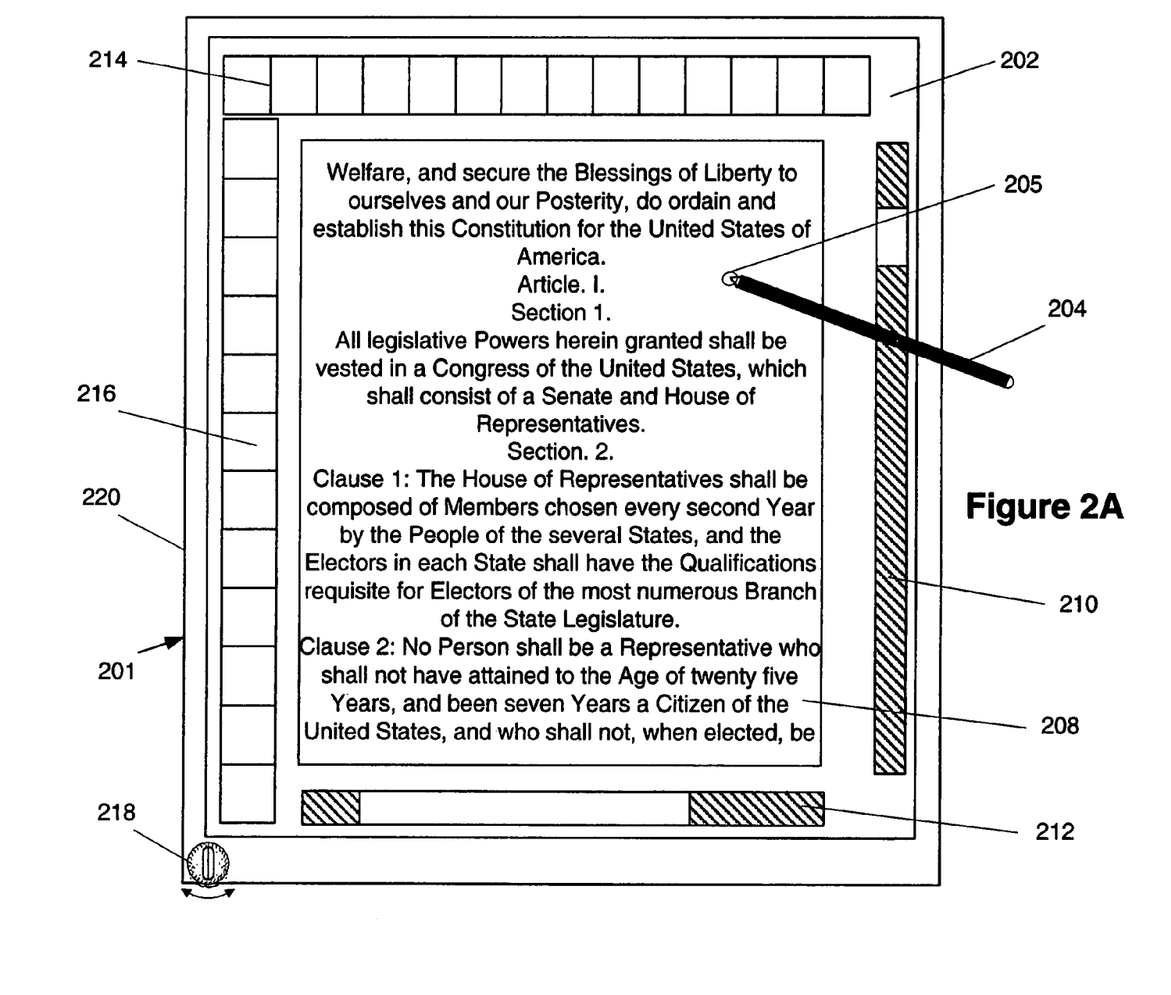
FIG. 2A is a top plan view of a stylus-based computer having a first display orientation according to aspects of the present invention.

FIG. 2A illustrates an illustrative tablet PC 201 that can be used in accordance with various aspects of the present invention. Any or all of the features, subsystems, and functions in the system of FIG. 1 can be included in the computer of FIG. 2A. Tablet PC 201 includes a housing 220 and a large display surface 202, e.g., a digitizing flat panel display, preferably, a liquid crystal display (LCD) screen, on which a plurality of windows may be displayed. In the example shown in FIG. 2A, a single window is shown displaying a textual document 208, a vertical scroll bar 210, a horizontal scroll bar 212, a header menu 214, and a toolbar 216. Textual document 208 is shown being displayed in a first orientation, such as portrait mode.

Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like. The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Region 205 shows a feedback region or contact region permitting the user to determine where the stylus 204 has contacted the display surface 202. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204.

Other types of input devices, such as a mouse, trackball, a scroll wheel, a fingerprint reader, a touch pad, a sweep sensor, or the like may also be used with tablet PC 201. One of more of these devices may be integrated with the tablet PC 201 and/or exist separately. For example, FIG. 2A shows an integral scroll wheel device 218 disposed near a corner of the tablet PC. Rolling the scroll wheel of device 218 may cause the text of textual document 208 to scroll up and down, which can be tracked by vertical scroll bar 210. In addition, scroll wheel 218 may be a multi-direction scroll wheel that can tilt laterally in a direction perpendicular to the roll direction of the wheel. Thus, lateral tilting of scroll wheel 218 can cause the text of textual document 208 to scroll laterally as tracked by horizontal scroll bar 212.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Directional Input Device Orientation and Display Orientation Control

Figure 2B:
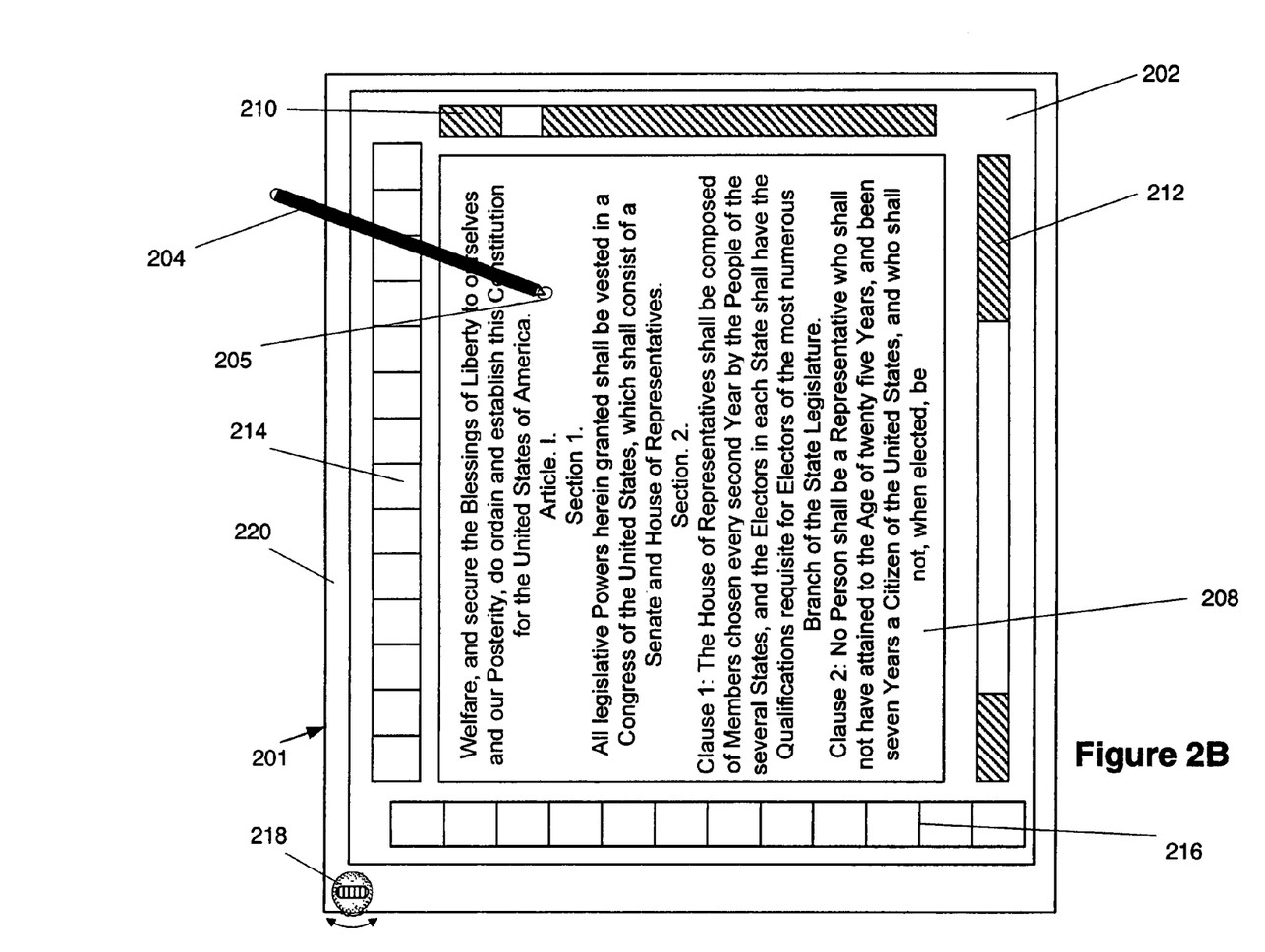
FIG. 2B is a top plan view of the stylus-based computer of FIG. 2A having a second display orientation.

Tablet PC 201 shown in FIGS. 2A and 2B includes a directional input device 218, which may change between a plurality of orientations. A user can change the orientation of input device 218 such that the input device can provide directional inputs that match a desired display orientation. In one configuration, if a user changes the orientation of the directional input device 218, the display 202 automatically changes its orientation to match the changed orientation of the input device. Permitting both the display and a related directional input device to change their orientations provides the user with flexibility for viewing displays on the computing device and for interacting well with those displays in various display orientations. Thus, for tablet PC 201, information display 202 may be oriented by the user in a desired mode (e.g., portrait or landscape) and the directional input device 218 can be correspondingly oriented to permit effective use of the input device to navigate the information displays. Although the two display modes known as portrait and landscape are primarily discussed herein, it is understood that numerous and different display orientations may be provided. Similarly, it is understood that numerous directional input orientations may be provided to match the various display modes.

The display 202 on tablet PC 201 has an unbalanced aspect ratio such that it has width greater than its length, or vice versa depending on its display orientation. Because many images, documents and information displays are wider than they are tall, the unbalanced aspect ratio of display 202 can be beneficial for displaying them in a landscape mode. Other images, documents and information displays are taller than they are wide, may benefit from being displayed in a portrait mode on display 202. This may also be true for other electronic systems adapted to practice aspects of the invention, including personal digital assistants (PDAs), mobile computers and personal computers. Tablet PC 202 supports switching the display between a portrait mode and a landscape mode to adapt to characteristics of the information being displayed. This can be advantageous for tablet PC 201, as it may be advantageous to enter information via stylus 204 in one orientation or another depending on various characteristics, such as the type of information being entered. For other computing systems upon which aspects of the invention may be practiced, it may also be advantageous to permit small displays to change their orientation, such as those used with PDAs, portable navigation devices, mobile telephones, etc. On such small displays, switching between modes can improve the display of various types of information. To improve navigation of the information displays, tablet PC 201 and other systems adapted for use with aspects of the present invention may include a directional input device 218, such as a scroll wheel device, that can support scrolling the information display.

Scrolling display 202 using directional input device 218 may be very useful for a display orientation that generally matches the input direction of the directional input. However, such scrolling may be ineffective for a display orientation that does not match the directional input. For instance, a scroll wheel that rolls in a plane disposed parallel to the height of a corresponding display may be very useful for vertically navigating within a document shown thereon. As an example, the scroll wheel device 218 of FIG. 2A may be useful for vertically scrolling within the text of textual document 208 while the document is oriented in the portrait mode. However, if the display were rotated ninety degrees to show it in a landscape mode without changing the orientation of scroll wheel device 218, the scroll wheel would not be very useful for horizontally scrolling within the rotated text of document 208. Thus, a directional input device that cannot adapt to changes in the display orientation may be very useful in one display orientation, but will likely have marginal usefulness for a second display orientation.

FIG. 2B illustrates a configuration of tablet PC 201 in which the display has been changed from the first orientation (e.g., portrait mode) of FIG. 2A to a second orientation (e.g., landscape mode). In the landscape display mode, the scroll wheel device 218 shown in FIG. 2B can be useful for vertically scrolling within textual document 208 according to vertical scroll bar 210. However, in the display orientation position shown in FIG. 2A, scroll wheel device 218 oriented as shown in FIG. 2B may only have limited usefulness for horizontally scrolling the portrait of document 208.

This may be true even if the scroll wheel device 218 is capable of receiving inputs for modifying the display in perpendicularly disposed linear directions (e.g., a tilt wheel device), because the secondary input directions are generally not as well suited for providing directional control instructions as is the primary input direction. For example, a tilt wheel device may provide better directional control for moving the display in the rolling plane of the wheel, rather than for moving the display in the tilting plane (lateral direction) of the wheel.

The orientation of scroll wheel device 218 in FIGS. 2A and 2B is changeable to correspond with a desired display mode orientation. Thus, scroll wheel device 218 of FIG. 2A is oriented to match the vertical scroll direction indicated by vertical scroll bar 210 shown thereon. Similarly, scroll wheel device 218 of FIG. 2B is oriented to match the horizontal scroll directions indicated by vertical scroll bar 210 shown thereon, which is oriented about ninety degrees from the FIG. 2A display. As discussed further below, scroll wheel device 218 may be the control device used to control switching of the orientation display modes on tablet PC 201. Thus, in the single step of changing the orientation of scroll wheel device 218 from a first position to a second position, a user may switch the display orientation along with orientation of the directional control 218.

Figure 4:
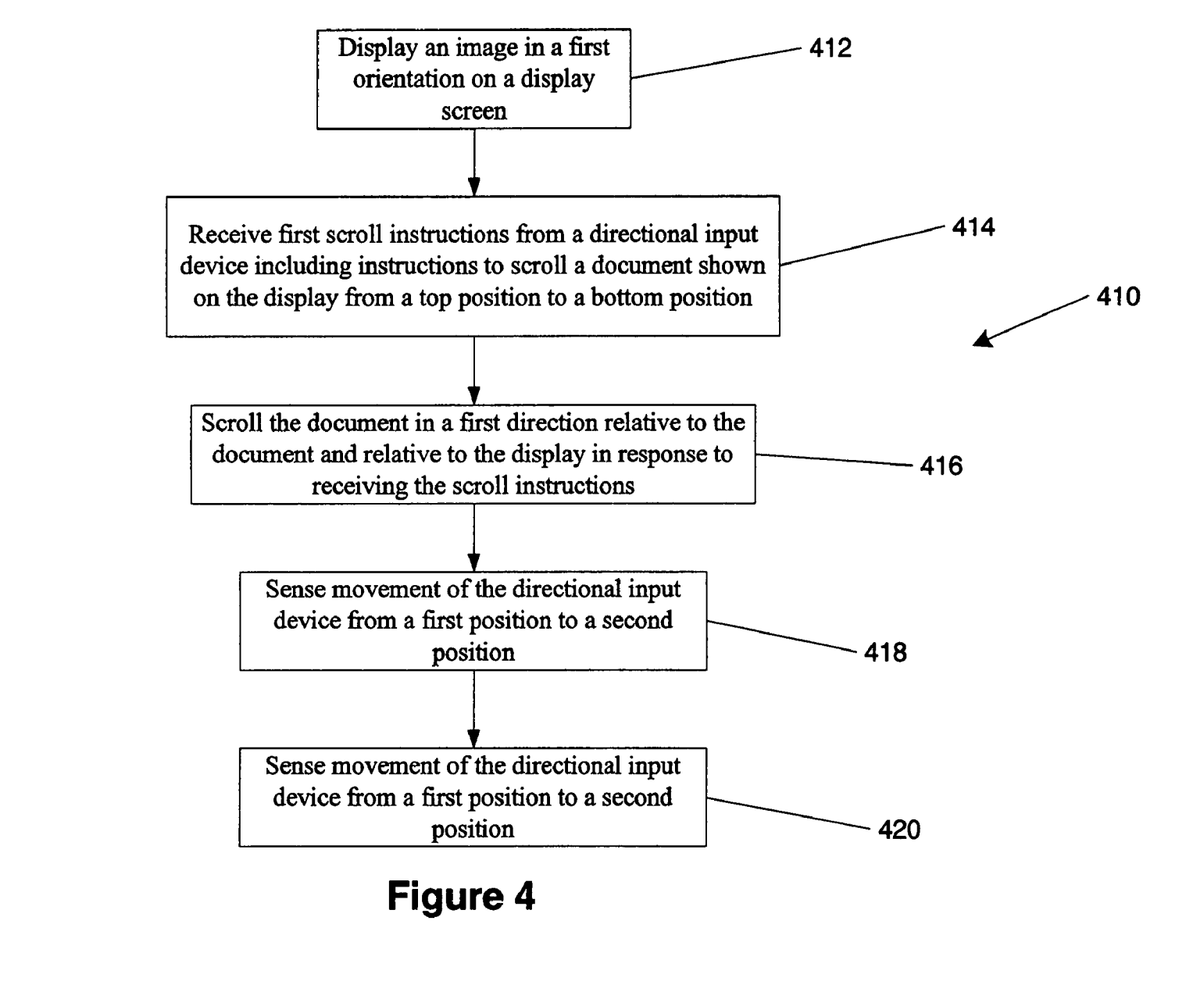
FIG. 4 shows a process for switching the orientation of an image on a display screen from a first orientation to a second orientation in accordance with aspects of the present invention.

FIG. 4 shows a process for switching the orientation of an image on a display, such as display 202 of tablet PC 201, from a first orientation (e.g., portrait mode) to a second orientation (e.g., landscape mode) in accordance with aspects of the present invention. Suppose as an example, that a user is using tablet PC 201 in the portrait mode shown in FIG. 2A and desires to change the display orientation and the directional input orientation of directional control 218 for use in the landscape mode shown in FIG. 2B. In accordance with process 410 shown on FIG. 4 and tablet PC 201 shown in FIGS. 2A and 2B, the tablet PC performs step 412 to display a document in a first orientation on the display screen. The user can scroll the document shown on the display screen by rolling the scroll wheel of scroll wheel device. In step 414, the tablet PC receives instructions from the scroll wheel device to scroll the document in accordance with the direction of roll, the roll speed, and the amount of roll the user applies to the wheel. In step 416, the tablet PC responds to the instructions by scrolling the displayed document as directed by the scroll wheel device (e.g., scrolls the document vertically).

In order to change the display orientation and directional control orientation, the user rotates the scroll wheel device about ninety degrees. As such, in step 418, the tablet PC senses movement of the directional input device from a first position to a second position. In response to sensing the movement of the scroll wheel device, at step 420, the tablet PC displays the document in the landscape mode, which is about ninety degrees from the portrait mode. In the new orientation, if the user rolls the scroll wheel of the scroll device, the document shown in FIG. 2B will move upwards or downwards in relation to the document.

In other configurations, the directional input device may have multiple rotary orientations, such as orientations between zero and 180 degrees or orientations between zero and 360 degrees, for which the display has matching orientations. In other configurations, the directional input device may rotate from a first position to one or more secondary positions oriented from about five degrees to about 175 degrees from the first position, for which the display has correspondingly oriented positions. These secondary positions may include step-wise orientations between zero and 180 degrees, such as positions that are five degrees from each other.

In further configurations, operation of the directional input device may change in response to changes in the display orientation. For example, a user may change the orientation of display 202 by 180 degrees using an on-screen command, shortcut keys, or other mechanisms. Operation of the directional input device may logically be changed in response to the display orientation change, such that the directional inputs are correspondingly changed. As an example, if the directional input device includes a scroll wheel, rolling the wheel in a first direction may scroll or pan the display upwards while its in a first display orientation. Rather than continuing to scroll the display upwards, when the display is changed to a second display orientation, such as being disposed about 180 degrees from the first display orientation, rolling the wheel in the first direction may scroll the display downwards. Thus, without changing the physical orientation of the directional control device, its functional orientation may be changed.

Directional Input Devices

Figure 3A:
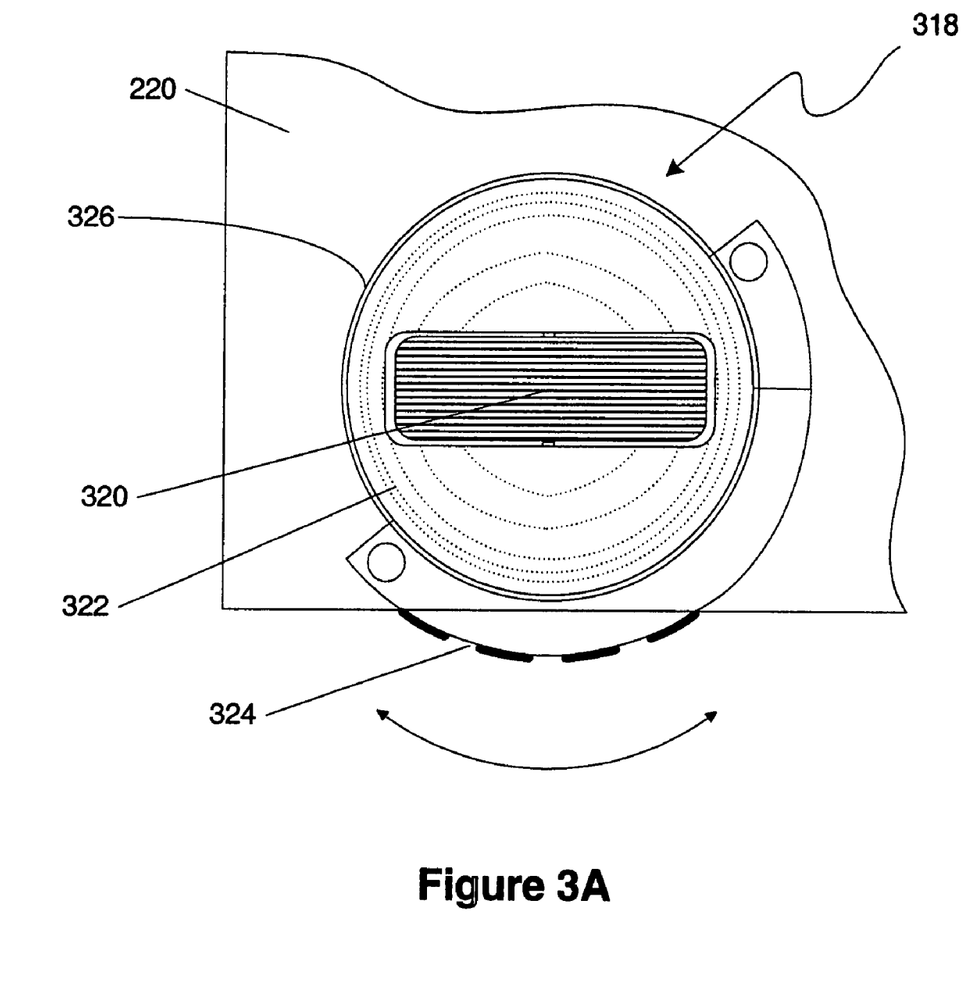
FIG. 3A is a close-up view of a directional input device of the stylus-based computer of FIGS. 2A and 2B.

FIGS. 3A-3F show scroll wheel input device 318, which may used as an input device on tablet PC 201. As shown in FIG. 3A, scroll wheel device 318 may be structurally integrated along with tablet PC 201 and may be substantially disposed within its display housing 220. It may be disposed proximate a corner of the display housing 220, which can permit it to be conveniently located for both portrait and landscape orientations. For instance, in the examples of FIGS. 2A and 2B, scroll wheel device 218 is located along the left side of the tablet PC for both orientations. This configuration can permit right-handed persons to use stylus 204 with their right-hand while scrolling the scroll wheel using their left hand.

The scroll wheel device 318 may be ergonomically located at desirable grip locations and it may be configured to encourage users to operate the wheel with the thumb or other finger of their grip hand. The scroll wheel device 318 may also be translatable or otherwise relocatable (not shown) to match a particular configuration for the user. Multiple scroll wheel devices may be located on a tablet PC at different locations to provide the user with options for holding the tablet PC and scrolling the displays, or to provide tablet PC configurations that accommodate both left and right handed individuals. In such a multi-scroll wheel embodiment (not shown), the user may select an "active" scroll wheel device that can control the display orientation. Further, in such a multi-scroll wheel embodiment, rather than changing the orientation of a directional input device, the user may simply "activate" a scroll wheel device having a desired directional input and a corresponding display orientation. For instance, the user could switch from a portrait display orientation to a landscape display orientation by activating a landscape-oriented scroll wheel device, which may automatically de-activate a previously used portrait-oriented scroll wheel device. Individual scroll wheel devices may be activated via contact sensors or proximity sensors in each device that sense human contact with the device.

Returning to the embodiment of FIGS. 3A-3F, scroll wheel device 318 shown in FIG. 3A includes a rotatable scroll wheel 320, a contact surface 322 for interfacing with a finger or thumb, and a dial 324. The contact surface 322 extends through an opening 326 in the display housing 220 such that it may generally be flush with or recessed below the surface of the display housing. Contact surface 322 may have a generally finger or thumb-sized dish shape that slopes downward from its perimeter near the surface of the display housing. Recessing the contact surface can discourage inadvertent actuation or movement of the scroll wheel, which can be disposed within the recessed dish such that its top surface is near or below the surface 220 of the display housing. A dish shape for the contact surface may suggest thumb or finger placement to a user of the tablet PC and can assist the user with locating the scroll wheel device by feeling for it. Dial 324 extends through a slot in the side of display housing 220 to permit a user to rotate the scroll wheel device by making sliding contact with the dial, such as by sliding a finger along the edge of the housing. The dial is attached to a turntable 326, which rotatably mounts the scroll device 318 within housing 220.

Figure 3B:
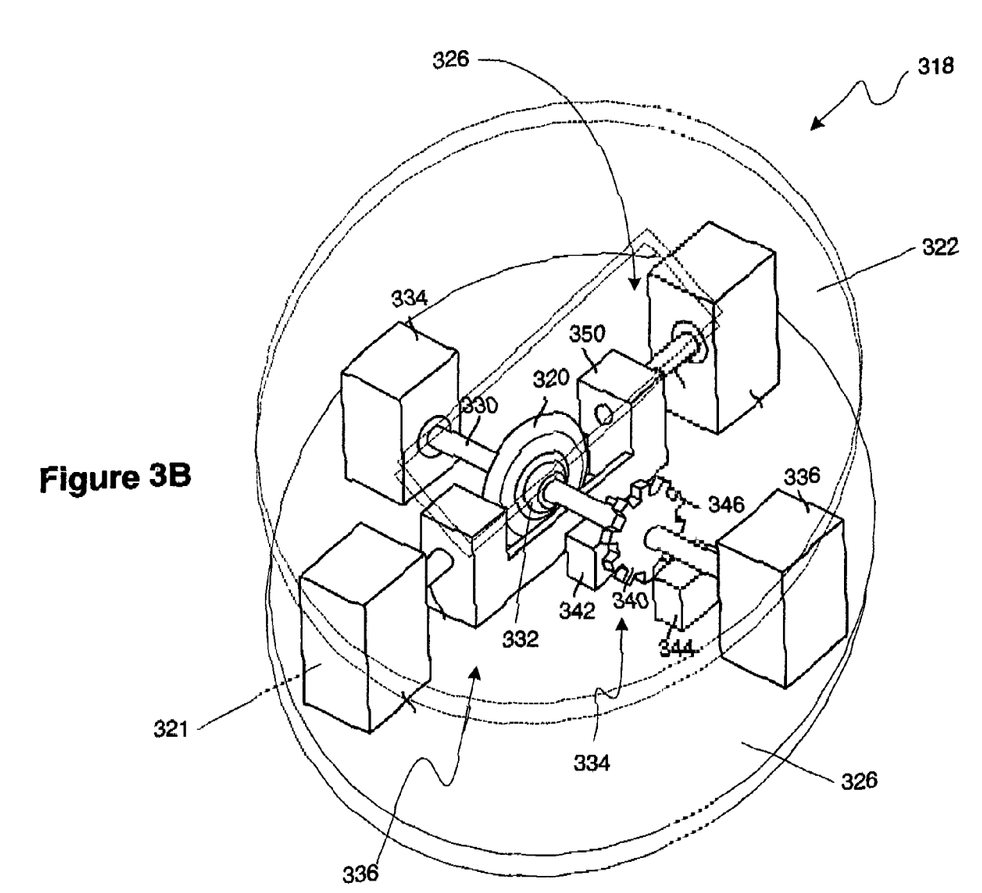
FIG. 3B is a schematic perspective view of a scroll wheel assembly of the directional input device of FIG. 3A.
Figure 3C:
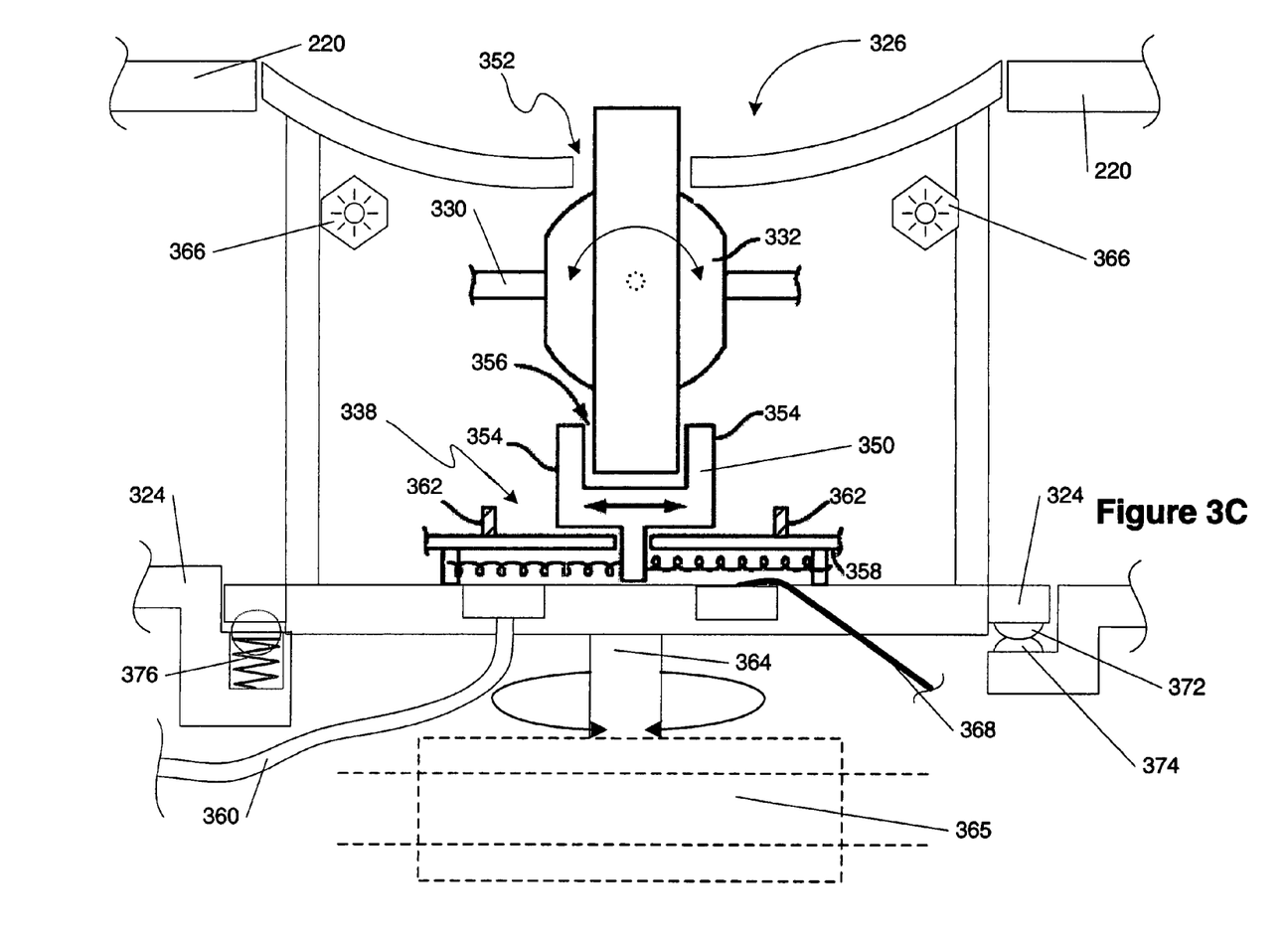
FIG. 3C is a schematic elevational view of the directional input device of FIG. 3A.

FIG. 3B is a schematic perspective view of scroll wheel assembly 318 showing turntable 326 and functional components of the scroll wheel assembly, and FIG. 3C is a schematic end view thereof. The scroll wheel 320 is shown reduced in size in FIG. 3B to assist with illustrating other components. It understood that a wide variety of scroll wheel assemblies might be used, such as scroll wheel assemblies having a single axis, as well as a wide variety of other directional input devices, such as sweep sensors.

As shown in FIG. 3B, functional components for tilt scroll wheel 318 include a wheel 320 that is rotatable about a primary axis and that permits side-to-side pivotable movement by tilting in the primary plane in which wheel 320 resides and rotates. Assembly 318 includes scroll wheel 320, a rotatable shaft 330, and a convex hub/ball joint 332. The opposing ends of the rotatable shaft 330 may be mounted within support blocks 332 and 334 having cylindrical bearing surfaces. Due to the coupling by the ball joint 332, a rotational force applied to the scroll wheel 320 will cause the shaft to rotate with the scroll wheel and with respect to its housing, and a laterally pivotable force applied to the scroll wheel will cause it to pivot laterally relative to the shaft 330. The ball joint 332 is fixed to the shaft 330 such that the ball joint rotates with the shaft.

Tiltable scroll wheel assembly 318 further includes a rotation sensing system 334, a tilting sensing system 336, and an alternate tilt biasing system 338. The rotation sensing system 334, which senses the rotation of the rotatable scroll wheel 320, includes a disk encoder 340 and separate elements 342 and 344 of an optical pair. The encoder 340 is fixedly mounted to the scroll wheel shaft 330. The outer periphery of the encoder wheel includes spaced light blocking elements, such as angularly spaced, radially extending blades 346. One of the optical pair elements is a light source 342 and the other is a light sensor 344. The rotation of the scroll wheel 320 rotates the shaft 330 and the encoder 340 mounted thereto. The spaced light blocking elements 346 periodically block the path of light to provide light pulses as the blades periodically block the light path. As encoder wheel rotates, light from the light source is alternately (1) transmitted through the openings and (2) blocked by the material of the encoder wheel. The pulses of light transmitted through the openings are detected by the light sensor. In response to the pulses of light, the light sensor transmits a signal via cable 360 to a host computer that indicates rotation of the scroll wheel, thereby inducing scrolling of the image relative to the display screen. Furthermore, the frequency of the sensed pulses corresponds to the rate at which the scroll wheel is being rotated. Accordingly, the rate at which the scroll wheel rotates is generally correlated to the speed at which the image scrolls.

As shown further shown in FIG. 3B, the tilting sensing system 336 includes at least one sensor 321 that determines when the wheel 320 is being tilted, which would typically occur by a lateral force being applied to the portion of the scroll wheel 320 extending through the opening 326 in the contact surface 322. The scroll wheel assembly 318 also includes a circuitry, such as a controller (not shown) for interpreting the output from sensor 321, converting the output to an electronic signal and delivering the signal to the host computer. The controller can be any known component or combination of components that can perform these functions. In one embodiment, the controller includes a microprocessor connected to sensor 321 that generates a signal for the host computer indicating when the scroll wheel 320 is being laterally moved.

An alternate embodiment for the tilt sensing system 336 is the tilt biasing system 338 shown in FIG. 3C. The tilt biasing system 338 includes a carriage 350 that receives the lower portion of the scroll wheel 320 on the side of the scroll wheel 320 that is opposite from the aperture 352 in the contact dish 322. The carriage 350 includes opposing side walls 354 on opposite sides of the bottom of the scroll wheel 320. The side walls may be separated by a small gap 356, such as 0.1 mm. When the scroll wheel 320 is tilted, it will move a small amount and then engage the side wall 354 on the side of the carriage 350 in which the scroll wheel 320 has been tilted. This small gap 356 enables sufficient tilting responsiveness without causing a drag on the scroll wheel when it is rotated along shaft 330. The carriage 350 will move by linearly sliding in accordance with movement of the scroll wheel 320. When movement of the carriage is sensed, an appropriate signal is sent to the microprocessor to cause lateral scrolling of the displayed document. The carriage 350 is coupled to a slide potentiometer 358, which is in turn, mounted to turntable 326. The slide potentiometer 358 senses the amount of displacement and provides an electrical resistance value accordingly. The carriage 350 may be biased toward a central position by the slide potentiometer or other biasing mechanisms to encourage the scroll wheel to return to its neutral lateral position.

For the sliding carriage arrangement of FIG. 3C, discrete contact sensors 362, such as contact switches, are provided on opposing sides of the wheel 320 and the carriage 350. Contact switches 362 sense when scroll wheel 320 has been tilted to a predetermined position indicating that the wheel 320 had been tilted. In other arrangements of the invention, not depicted, the sensors for detecting the tilting motion of the wheel 320 via the sliding motion of the carriage 350 include strain gauges, force plates, and pressure sensors to determine the lateral displacement of the carriage.

Overall, each sensor of the scroll device sensing systems is operatively connected to the microprocessor for generating an electrical signal that controls the position of the image relative to the display screen. The generated signal controls the scrolling of the displayed image along the X-axis and/or Y-axis in response to a force that causes the wheel 320 to rotate and/or tilt laterally. The signal scrolls the image in a manner that is consistent with the direction and magnitude of the applied force, i.e., either left or right. Other embodiments may include a force sensor for sensing forces downwardly applied to the scroll wheel 320, which may indicate that the user is clicking or otherwise indicating a selection.

As shown in FIG. 3C, turntable 326 is rotatably mounted within housing 220 in an appropriate manner. For instance, turntable shaft 364 may be received into a known sleeve and bearing arrangement (not shown) for supporting a turning shaft, which may be mounted to support structure within housing 220 for permitting rotation of the turntable. In another example, turntable shaft 364 may be connected to an optional motor 365, which may mechanically swivel the turntable in response to a change in the display orientation or in response to a command to change the display orientation. Cable 360 is attached to the turntable, which permits the scroll wheel assembly to communicate with components of the tablet PC as appropriate, such as to provide tilt and scroll information, receive power, and to receive instructions, such as illumination instructions for the lights 366 attached to the scroll wheel assembly. As discussed later in connection with FIG. 7, aspects of the invention include illuminating the directional input device to provide directional indicators, to identify control locations, and/or to provide system state information. Lights 366 may be used in conjunction with those aspects of the invention.

Dial 324 is shown attached to turntable 326 to permits a user to rotate the scroll wheel assembly 318 as desired. The user may rotate the dial by making sliding contact with a portion of the dial extending through a slot at an edge region of the tablet PC housing 220. Rotation of the scroll wheel assembly may be between two stable positions, which may be oriented about ninety degrees apart. Other orientations are possible, such as a third stable position oriented about 180 degrees from the first position, a fourth orientation disposed between about five degrees and eighty-five degrees from a first orientation, as well as additional orientation positions. Electrical contact is made at one or both of the end positions, which is reported to the system so it can automatically change the orientation of the information display. For instance, an electrical contact 372 on dial 324 may complete a circuit with an electrical contact 374 attached to housing 220, which can indicate that the scroll wheel assembly is oriented in an identified one of the stable positions. Other position sensors may also be used to monitor orientation of the scroll wheel assembly, such as a proximity sensor (not shown) or a magnetic sensor (not shown) mounted in the housing 220 or on the scroll wheel assembly, which senses the proximity of a corresponding device on the scroll wheel assembly. The scroll wheel assembly may be retained in the stable positions via a détente 376 mounted to the housing 220 that engages a depression on dial 324 when it is located in a corresponding one of the stable positions. Other mechanisms for biasing and/or retaining the scroll wheel assembly 318 in pre-set orientations may also be used, such as interfering projections (not shown) that engage one another when proximate to a stable position.

Figures 3D, 3E, 3F:
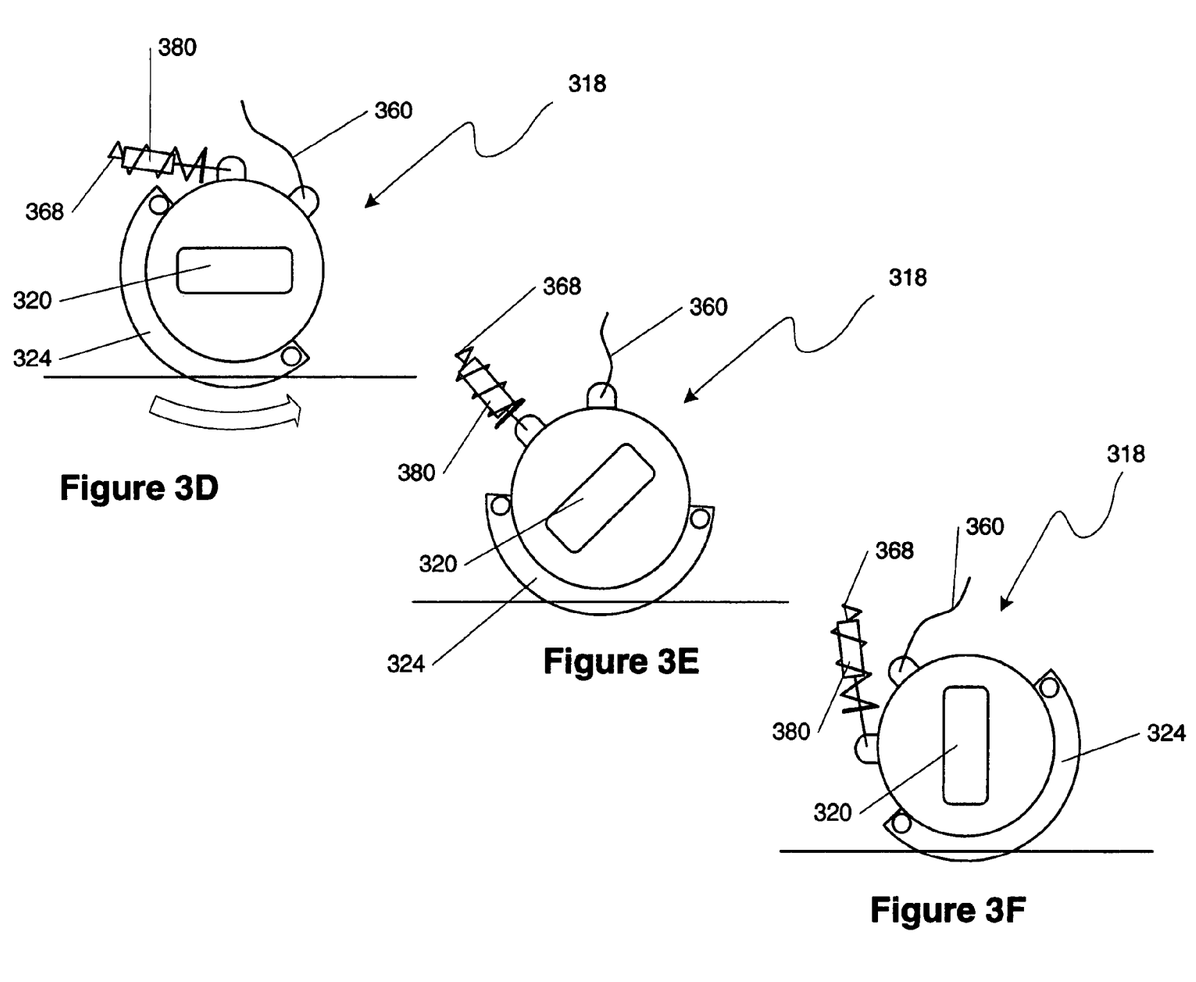
FIGS. 3D-3F are schematic top views of the directional input device of FIG. 3A illustrating movement of the directional input device from a first orientation to a second orientation in accordance with aspects of the present invention.

As shown in FIGS. 3D-3F, rotation of the scroll wheel assembly 318 between these two positions can be aided by an over-center force mechanism, such as a spring-damper 380, for which a connector 368 thereto as shown in FIG. 3C. Rotating the scroll wheel assembly about 45 degrees causes it to 'over-center' and thus continue rotating the remaining 45 degrees on its own. Spring-damper 380 uses a compression spring 382 with a damper 384 to bias the scroll wheel assembly 318 toward one of the stable positions. Damper 384 is an asymmetric damper that dampens extension of compression spring 382 without dampening compression of spring 382. As such, damper 384 softens rotation of the scroll wheel assembly during the remaining portion of its rotation, which can reduce the possibility of it snapping into its new position. Damper 384 may be asymmetric such that it does not oppose the user's rotation of the dial 324. Spring-damper 380 may be used with or without retention mechanisms for retaining assembly 318 in a stable position, such as détente 376, or rotation limiters. Without the use of these mechanisms, spring damper 380 may be adapted to act as a retention mechanism and/or a rotation limiter. It can be act as a rotation limiter via defined limits on its extensibility. It can also act as a retention mechanism by providing an extension force that is large enough to bias assembly 318 into one of the stable positions and to reduce the possibility of inadvertent rotation from the stable positions.

Figures 5A, 5B:
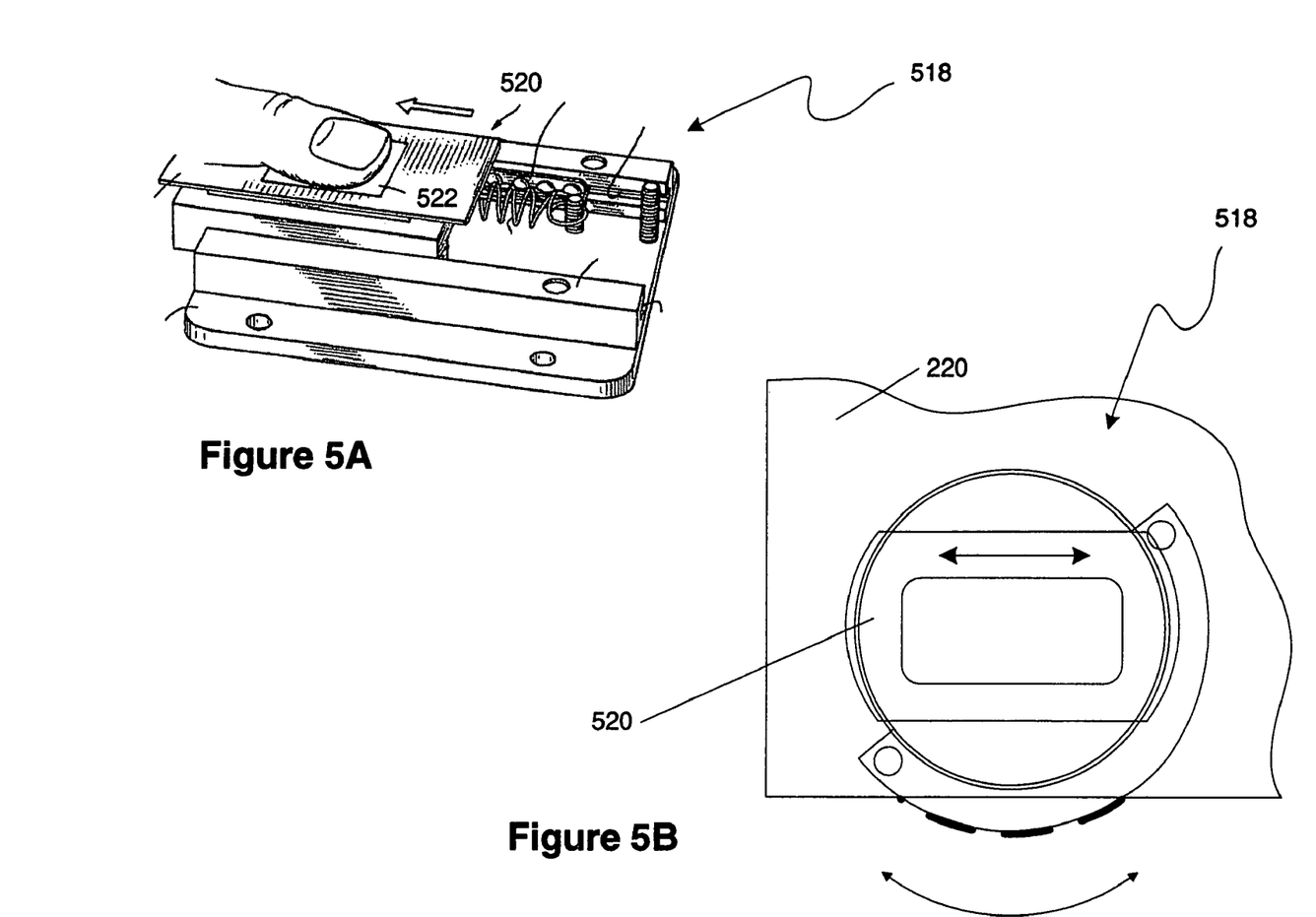
FIG. 5A is a perspective view of a fingerprint scanner input device in accordance with aspects of the present invention, illustrating the platen assembly moved away from a default position.
FIG. 5B is a top plan view of another embodiment of a directional input device that includes the fingerprint scanner input device of FIG. 5A.

Referring now to FIGS. 5A and 5B, a directional control device 518 is shown. Device 518 is similar to directional control devices 218 and 318, except that it includes an optical scanner 518, such as a fingerprint scanner, that has a slidable platen 520. Beneath the slidable platen is an optical scan head (not shown) that captures a biometric image of a person's finger disposed on top of a platen window 522 as a series of scan lines. A computer system can monitor translation of platen 520 for sensing directional inputs and the optical scan head can sense the presence of a user's finger. As such, optical scanner 518 may be adapted for use as a directional control device for use with a tablet PC, personal computer, PDA or other device having multiple display orientations. FIG. 5B shows the slidable optical scanner mounted on a turntable and within tablet PC housing 220 in a manner similar to scroll wheel device 318. Slidable optical scanner 518 can be rotated as desired to permit the slide orientation to correspond with a display orientation, and/or to change the orientation of the display.

Figure 6A:
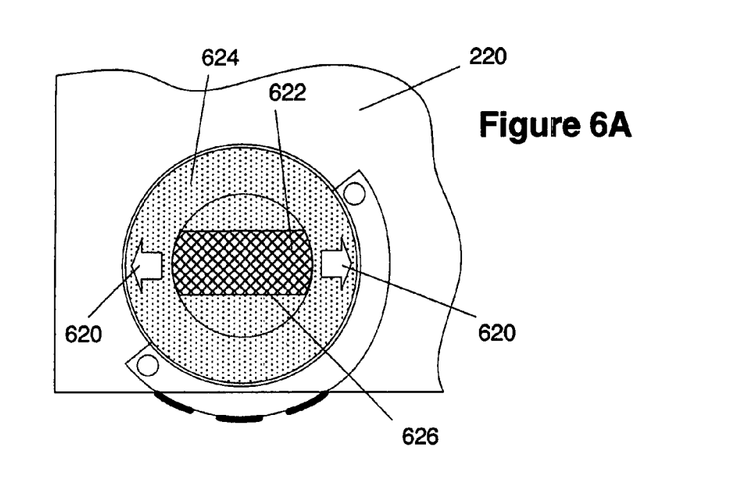
FIG. 6 is a top plan view of a further embodiment of a directional input device in accordance with aspects of the present invention.
Figure 6B:
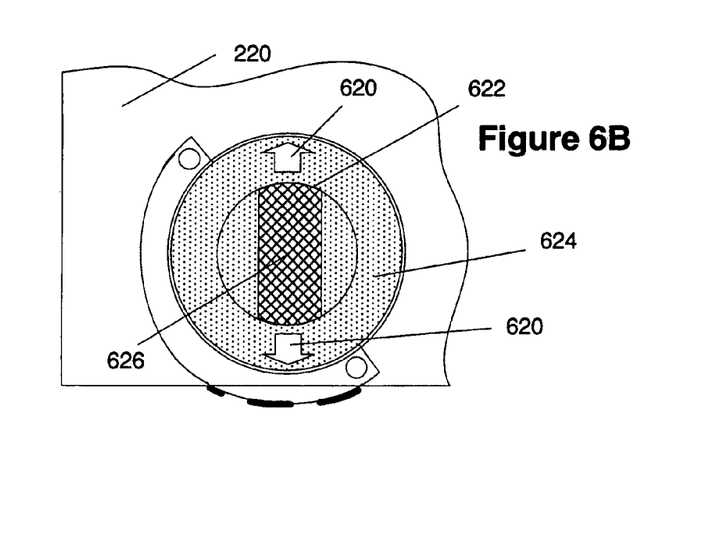

FIGS. 6A and 6B show a directional control device 618 that is similar to devices 218, 318 and 518, except that the orientation of the directional input device does not change in order to change the display orientation or to change the directional input orientation. Rather, indicators 620 are movable between directional input orientations that correspond with display orientations. Movement of the directional indicators causes the display orientation to be correspondingly moved, but the orientation of input sensor 622 itself does not change. This is because the input sensor 622 can receive inputs in multiple directions. However, the directional indicators direct the user to provide inputs in a certain direction or limit the user inputs to be along the generally linear direction of indicators 620.

Directional control device 618 includes a touch pad 622 and/or a sweep pad 622, which devices known in the art for sensing user contact and movement on the pad. As pad 622 can sense motion in multiple directions, it does not need to be rotated to in order to change the direction of inputs sensed thereon. However, it may be desirable to limit user input on the pads to a particular direction, such as for receiving scroll inputs. For instance, it may be easier and/or less expensive to install a small touch or sweep pad 622 onto housing 220 to provide scroll functionality than to install a scroll wheel device. As such, directional control device 618 includes a rotatable cover 624 that covers portions of pad 622 such that only substantially directional inputs are available to the user. The rotatable cover 624 may optionally include indicators 620 to show the orientation of the directional input; however, the exposed directional portion 626 of pad 622 may simply indicate the orientation for directional input. Rotatable cover 624 may be attached to a turntable similar to turntable 324 for permitting a user to rotate the cover. Rotation of the cover changes the display orientation in a manner similar to previously discussed embodiments. In another embodiment, pad 622 may be movably mounted to rotate along with the turntable.

Figure 7:
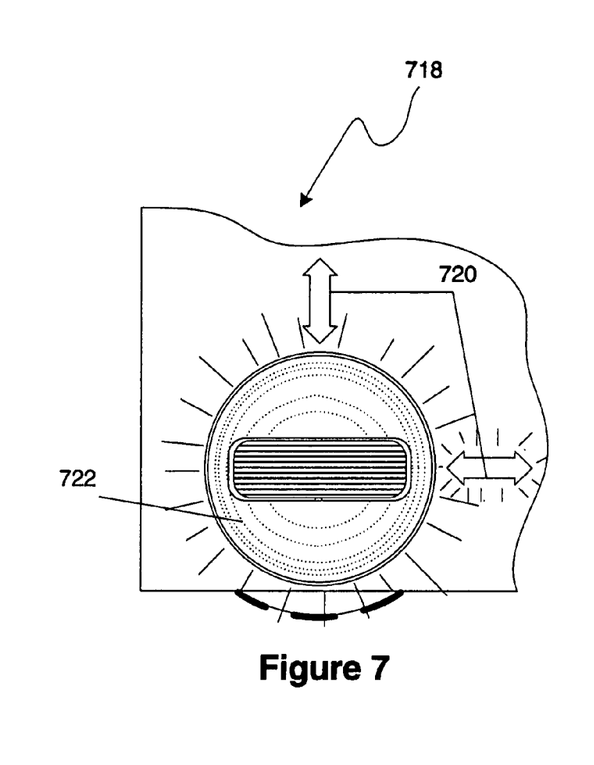
FIG. 7 is a top plan view of an additional embodiment of a directional input device in accordance with aspects of the present invention.

FIG. 7 shows a show a directional control device 718 that is similar to previously-discussed directional control devices. However, directional control device 718 includes illuminated orientation indicators 720, which illuminate to show the present orientation of the display and the directional control. In addition, the cover 722 of control device 718 may be made of a light-transmitting material, such as polycarbonate, which permits light from a lamp (e.g., lamp 366 of FIG. 3C) to pass freely or diffusively through the cover.

The cover 722, indicators 720 and/or other indicia may be illuminated to identify various system states. For example, cover 722 may be illuminated by a first colored lamp when the system is turned on and is fully operational, such as by a green lamp. It may be illuminated by a second colored lamp (e.g., red) when the system has a certain condition, such as a low battery condition. The lamps may also illuminate in response to certain user actions. For example, the cover may illuminate when the system detects a finger or thumb near the cover. The cover and/or indicators may also indicate system states in other ways, such as by flashing during an error condition.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals. Further, it is understood that aspects of the invention may be used with stand-alone directional controls that are functionally related to a computing device, such as a mouse having a scroll wheel input that is movable from a first orientation to a second orientation on the mouse, or such as a keyboard having an integrated directional control device that is movable between orientations.

I claim:

1. A system for displaying an image in a plurality of orientations comprising:
    a processor creating a renderable image in a first orientation;
    a display showing the image in the first orientation; and
    a directional input device being movable between a first position associated with a first display orientation and a second position associated with a second display orientation, the movement of the directional input device between the first position and the second position controls the rendering of the image between the first display orientation and the second display orientation, and, if the display changes to render the image in a second orientation, directional functionality of the directional input device changes from a first directional functionality associated with the first image orientation to a second directional functionality associated with the second image orientation.

2. The system according to claim 1, wherein, if the directional input device moves from the first position to the second position, the processor creates the renderable image in the second orientation and the display shows the image in the second orientation.

3. The system according to claim 1, wherein the second orientation is one-hundred eighty (180) degrees from the first orientation, and the second directional functionality is one-hundred eighty (180) degrees from the first directional functionality.

4. The system according to claim 1, wherein the directional input device includes a turntable permitting the directional input device to rotate from the first position to the second position.

5. The system according to claim 4, wherein the directional input device includes a scroll wheel that rotates between the first position and the second position.

6. The system according to claim 5, wherein the directional input device includes a biasing member encouraging the turntable to remain in the first position, and if the turntable rotates away from the first position toward the second position, encouraging the turntable to continue rotating into the second position.

7. The system according to claim 6, wherein the biasing member includes a compression spring and a damper.

8. The system according to claim 4, wherein the directional input device includes a tilt scroll wheel that rotates around a primary axis and permits side-to-side movement in the primary plane in which the wheel resides and rotates.

9. The system of claim 4, wherein the directional input device includes a relocatable scroll wheel assembly.

10. The system according to claim 1, wherein the directional input device includes a slidable optical scanner movable as desired to change between the first display orientation and the second display orientation.

11. The system according to claim 1, wherein the directional input device includes a static input sensor and a movable orientation indicator that moves between the first position and the second position.

12. The system according to claim 11, wherein the static input sensor includes one of; touch pad or a sweep sensor.

13. The system according to claim 11, wherein the orientation indicator includes a pointer identifying a primary control direction for the directional input device.

14. The system according to claim 11, wherein the orientation indicator includes a light source.

15. The system according to claim 14, wherein the light source illuminates a pointer identifying a primary control direction for the directional input device.

16. The system according to claim 14, wherein the orientation indicator includes a light-transmitting contact surface and the light source illuminates the contact surface.

17. The system according to claim 14, wherein the light source illuminates in accordance with a state of the system.

18. The system according to claim 1, wherein the directional input device includes one of: a fingerprint reader, a touch pad, a sweep sensor, or a scroll wheel.

19. The system according to claim 1, wherein the directional input device includes a contact surface and a contact sensor.

20. The system according to claim 19, wherein the contact sensor includes one of; a proximity sensor or a touch sensor.

21. The system according to claim 1, wherein the first image orientation is from zero (0) degrees to one-hundred eighty (180) degrees from the second image orientation.

22. The system according to claim 21, wherein the first image orientation is from zero (0) degrees to ninety (90) degrees from the second image orientation.

23. The system according to claim 21, wherein the first image orientation is ninety (90) degrees from the second image orientation.

24. A directional input device for scrolling an image relative to a display screen and for indicating the orientation of a display image, the movable control comprising:

a directional input sensor that detects user instructions for scanning an image in a first direction relative to the display screen; and a directional indicator that provides a visual indication of the orientation of the image and the scan direction for scanning the image, the directional indicator being movable between a first position and a second position, the first position being associated with a first orientation of the display image and the second position being associated with a second orientation of the display image, the directional indicator movement occurs independent to the detection of user instructions for scanning an image by directional input sensor, wherein the independent movement of the directional indicator to the directional input sensor enables the directional input sensor to detect user instructions for scanning—an image in the first direction relative to the display screen when the directional indicator is in the second position.

25. The directional input device according to claim 24, further comprising a turntable permitting the directional indicator to rotate from the first position to the second position.

26. The directional input device according to claim 25, further comprising a biasing mechanism biasing the directional indicator toward one of: the first position or the second position.

27. The directional input device according to claim 26, wherein the directional input sensor includes a scroll wheel device having a scroll wheel, and the directional indicator includes a visible portion of the scroll wheel.

28. The directional input device according to claim 27, further comprising a dish substantially disposed about the scroll wheel, wherein the scroll wheel extends through a bottom portion of the dish such that an upper portion of the scroll wheel is disposed above the dish bottom portion and a bottom portion of the scroll wheel is disposed below the dish bottom portion.

29. The directional input device according to 24, wherein the directional indicator includes a pointer identifying a primary control direction for the directional input device.

30. A method for switching the orientation of an image on a display screen from a first orientation to a second orientation, the method comprising:

displaying an image at a first orientation on a display screen;

receiving first scan instructions from a directional input device, the first scan instructions including instructions to scan content shown in the image from a top position to a bottom position, wherein the directional input device includes a directional indicator that provides a visual indication of an orientation of the image and a scan direction for scanning the image;

scanning the content in a first direction relative to the content and relative to the display in response to receiving the scan instructions;

sensing, by way of a directional input sensor, movement of the directional input device from a first position to a second position, wherein the independent movement of the directional indicator to the directional input sensor enables the directional input sensor to detect user instructions for scanning the image in the first direction relative to the display when the directional indicator is in the second position;

displaying the image at a second orientation on the display screen in response to sensing the movement of the directional input device from the first orientation;

receiving second scan instructions from the directional input device, the second scan instructions including instructions to scan the content from the top position to the bottom position; and scanning the content in a second direction in response to receiving the scan instructions, the second direction being the same as the first direction relative to the content.

31. The method according to claim 30, wherein, for displaying the image at a second orientation, the second orientation is rotated ninety (90) degrees from the first orientation.

32. The method according to claim 30, wherein, for displaying the image at a second orientation, the second orientation is rotated one-hundred eighty (180) degrees from the first orientation.

33. The method according to claim 30, further comprising illuminating the directional input device.

34. The method according to claim 33, wherein illuminating includes sensing a system state and selecting a first illumination condition based on the system state.

35. A computer-readable medium having a computer-executable program stored thereon, the program for switching the orientation of an image on a display screen from a first orientation to a second orientation and comprising the acts:

displaying an image at a first orientation on a display screen;

receiving first scan instructions from a directional input device, the first scan instructions including instructions to linearly scan content shown in the image, wherein the directional input device includes a directional indicator that provides a visual indication of an orientation of the image and a scan direction for scanning the image;

scanning the content in a first direction relative to the content and relative to the display in response to receiving the scan instructions;

sensing, by way of a directional input sensor, rotational movement of the directional input device from a first position to one or more second position oriented step-wise in five (5) degree increments from five (5) degrees to one-hundred eighty (180) degrees from the first position, wherein independent movement of the directional indicator to the directional input sensor enables the directional input sensor to detect user instructions for scanning the image in the first direction relative to the display when the directional indicator is in the second position;

displaying the image at a second orientation on the display screen in response to sensing the movement of the directional input device, the second orientation correspondingly step-wise oriented to the step-wise movement of the directional input device;

receiving second scan instructions from a directional input device, the second scan instructions including instructions to linearly scan content shown in the image; and scanning the content in a second direction relative to the second orientation on the display in response to receiving the scan instructions.

36. The computer-readable medium according to claim 35, further comprising the acts:

receiving second scan instructions from the directional input device, the second scan instructions including instructions to linearly scan the content; and scanning the content in a second direction in response to receiving the scan instructions, the second direction being the same as the first direction relative to the content.

37. The computer-readable medium according to claim 35, wherein, for displaying the image at a second orientation, the second orientation is rotated ninety (90) degrees from the first orientation.

38. The computer-readable medium according to claim 35, wherein, for displaying the image at a second orientation, the second orientation is rotated one-hundred eighty (180) degrees from the first orientation.

39. The computer-readable medium according to claim 35, further comprising the act: illuminating the directional input device.

40. The computer-readable medium according to claim 39, wherein illuminating includes sensing a system state and selecting a first illumination condition from a plurality of illumination conditions based on the system state.

41. A system for displaying an image in a plurality of orientations comprising:
- a processor creating a renderable image in a first orientation;
- a display showing the image in the first orientation; and
- a directional input device being movable between a first position associated with a first display orientation and a second position associated with a second display orientation, the first display orientation being disposed ninety (90) degrees from the second display orientation, the directional input device is a scroll wheel assembly including:
  - a turntable permitting the scroll wheel assembly to rotate from the first position to the second position; and
  - a scroll wheel sensing user instructions for scanning the image in a first direction relative to the display; and
  - a directional indicator providing a visual indication of the orientation of the image and the scan direction for scanning the image, the directional indicator includes a visible portion of the scroll wheel, the turntable permitting the directional indicator to rotate between a first position and a second position, the first position being associated with a first orientation of the display image and the second position being associated with a second orientation of the display image; wherein, if the directional input device moves from the first position to the second position, the processor creates the renderable image in the second orientation and the display shows the image in the second orientation and the sensing of the user instructions for scanning in the image in the second orientation is in the first direction.

* * * * *